[22.] Christian Scherich's Improved Spiral Cheek Springs.

No. 118,648. Patented Aug. 29, 1871.

Witnesses.
J. B. Frawbaugh
Levi E. Steinbarger

Inventor:
Christian Scherich

UNITED STATES PATENT OFFICE.

CHRISTIAN SCHERICH, OF LISBURN, PENNSYLVANIA.

IMPROVEMENT IN CHECK-SPRINGS FOR VEHICLES.

Specification forming part of Letters Patent No. 118,648, dated August 29, 1871.

*To all whom it may concern:*

Be it known that I, CHRISTIAN SCHERICH, of Lisburn, in the county of Cumberland and State of Pennsylvania, have invented a new and Improved Check-Spring; and I do hereby declare that the following is a full and exact description thereof, reference being had to the accompanying drawing making a part of this specification, in which—

Figure 1:
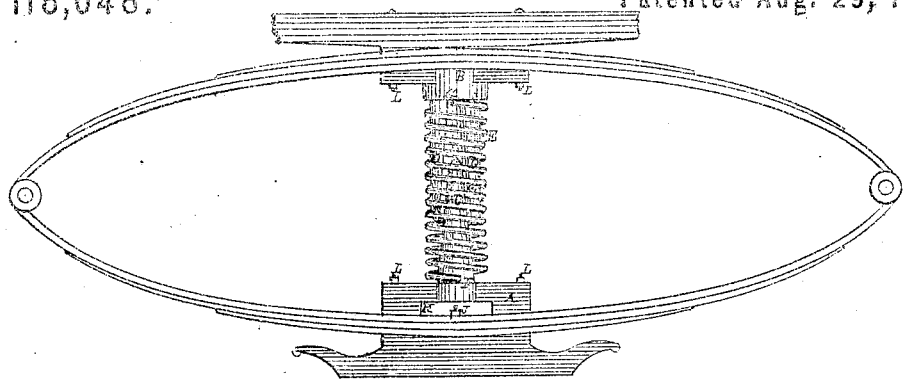
Figure 3:
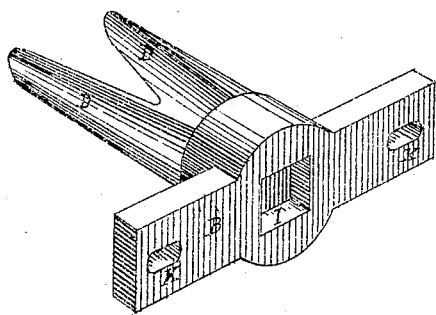
Figure 2:
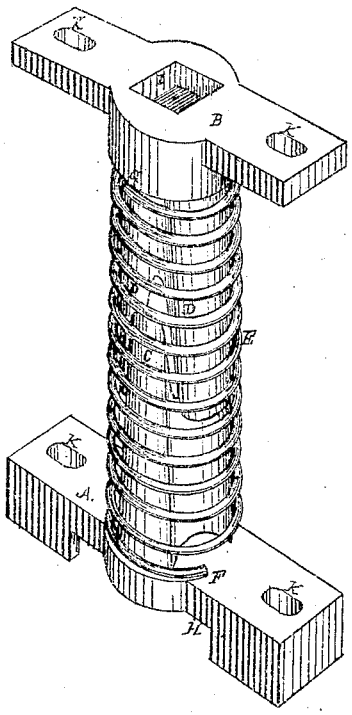
Figure 4:
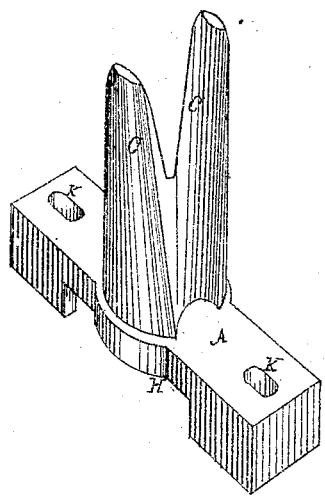

Figure 1 is a side view of the improvement, showing how it is attached to an elliptic spring. Fig. 2 is a perspective view of the improvement when complete and ready to be applied. Fig. 3 is a perspective view of the upper or top guide-support with its forked guides. Fig. 4 is a perspective view of the lower or bottom guide-support and its forked guides.

Similar letters refer to like parts in the several figures.

Great difficulty is often experienced in elliptic springs by their becoming too weak, from constant use, to withstand the burden put upon them, thereby becoming jammed and almost useless. My invention effectually obviates these difficulties.

To enable others to make and use my said invention, I will now proceed to describe its construction and operation.

In the accompanying drawing, A and B, Figs. 3 and 4, are two guide-supports, each having forked guides C C and D D, these guides or forks D D, Fig. 3, being placed into and at a right angle to the guides or fork C C, Fig. 4, so that these guide-supports A and B, with their guides or forks C C and D D, being placed, as above stated, over and into the other, will make said guide-supports A and B, Figs. 3 and 4, stand parallel one with the other, and will also protect and keep them in a secure and upright position, as shown at Fig. 2. In Fig. 2, E is a coiled or spiral wire spring, being placed around the outside of the forked guides C C and D D, the one end of said spiral spring E resting on the lower guide-support A at F, and the other end pressing upward against the upper guide-support B at G. There are recesses H and I in the upper and lower guide-supports A and B, to receive the ends of screw-bolts and nuts of the elliptic spring. One of each of these bolt ends and nuts is seen under lower guide-support A at J, Fig. 1. There are oblong holes K K K, &c., in the guide-supports A and B, for the reception of screw-bolts to fasten them (the said guide-supports) securely to the elliptic springs, as represented at L L and L L, Fig. 1.

I am fully aware that there has been and is still in use a gum check-spring intended and used for the same purpose as that of mine; but such springs do not afford sufficient elasticity, and become nearly solid, so as not to answer the purpose that they were intended for.

It will be perceived that the above-described arrangement, when being under a burden, will have considerable elasticity still, which would not be the case in the gum spring-check.

Having thus described my invention, what I claim as new in check-springs, upon the principle above set forth and described, is—

The forked guides C C and D D, constructed and operating substantially as above described, in combination with the coiled or spiral spring E, when operating, applied, and used for the purpose specified.

CHRISTIAN SCHERICH.

Witnesses:
D. B. CARL,
JNO. RYNARD.